(12) United States Patent
Wei et al.

(10) Patent No.: US 10,673,027 B2
(45) Date of Patent: Jun. 2, 2020

(54) POUCH-TYPE SECONDARY BATTERY

(71) Applicant: CONTEMPORARY AMPEREX TECHNOLOGY CO., Ningde (CN)

(72) Inventors: Zengbin Wei, Ningde (CN); Chengdong Sun, Ningde (CN); Dong Duan, Ningde (CN); Xinghui Wang, Ningde (CN); Xiang Li, Ningde (CN)

(73) Assignee: CONTEMPORARY AMPEREX TECHNOLOGY CO., LIMITED, Ningde, Fujian Province (CN)

( * ) Notice: Subject to any disclaimer, the term of this patent is extended or adjusted under 35 U.S.C. 154(b) by 104 days.

(21) Appl. No.: 16/138,534

(22) Filed: Sep. 21, 2018

(65) Prior Publication Data

US 2019/0027712 A1     Jan. 24, 2019

Related U.S. Application Data

(63) Continuation of application No. PCT/CN2016/079470, filed on Apr. 15, 2016.

(51) Int. Cl.
*H01M 2/02* (2006.01)
*H01M 2/34* (2006.01)
(Continued)

(52) U.S. Cl.
CPC ............. *H01M 2/026* (2013.01); *H01M 2/02* (2013.01); *H01M 2/021* (2013.01); *H01M 2/0212* (2013.01); *H01M 2/0272* (2013.01); *H01M 2/0275* (2013.01); *H01M 2/34* (2013.01); *H01M 10/0436* (2013.01); *H01M 2/08* (2013.01)

(58) Field of Classification Search
None
See application file for complete search history.

(56) References Cited

FOREIGN PATENT DOCUMENTS

| CN | 102969463 A | 3/2013 |
|---|---|---|
| CN | 105261730 A | 1/2016 |

(Continued)

OTHER PUBLICATIONS

Contemporary Amperex Technology Co., Limited, International Search Report (including written opinion of the internal search authority), PCT/CN2016/079470.

(Continued)

*Primary Examiner* — Sarah A. Slifka
(74) *Attorney, Agent, or Firm* — Morgan, Lewis & Bockius LLP

(57) ABSTRACT

The present disclosure provides a pouch-type secondary battery, which comprises an electrode assembly, a packaging film. The packaging film comprises a first receiving portion, a second receiving portion, a third receiving portion. The third receiving portion is parallel to the first receiving portion, a portion of the electrode tab extends out of the third receiving portion. A joint location between the second receiving portion and the first receiving portion and a joint location between the second receiving portion and the third receiving portion each are formed with a bending angle, the bending angles are equal and each range from 130° to 160°. Because the bending angles in the range are relatively large, when the packaging film is tightly pressed, there is no need to apply a too large pressure on the second receiving portion and the third receiving portion, so the electrode tab is not easily damaged or even ruptured.

16 Claims, 6 Drawing Sheets

(51) Int. Cl.
*H01M 10/04* (2006.01)
*H01M 2/08* (2006.01)

(56) References Cited

FOREIGN PATENT DOCUMENTS

| | | |
|---|---|---|
| CN | 105406086 A | 3/2016 |
| EP | 1291934 A2 | 3/2003 |
| EP | 2999023 A1 | 3/2016 |
| KR | 20070074390 A | 7/2007 |

OTHER PUBLICATIONS

Contemporary Amperex Technology Co., Limited, Extended European Search Report, EP16898274.2, dated Aug. 2, 2019, 8 pgs.

POUCH-TYPE SECONDARY BATTERY

REFERENCE TO RELATED APPLICATIONS

This application is a continuation of PCT/CN2016/079470, filed on Apr. 15, 2016, which is incorporated herein by reference in its entirety.

FIELD OF THE PRESENT DISCLOSURE

The present disclosure relates to the field of battery technology, and particularly relates to a pouch-type secondary battery.

BACKGROUND OF THE PRESENT DISCLOSURE

At present, a structure of a conventional pouch-type battery is shown in FIG. 1. In general, an electrode assembly 1, which is composed of a positive electrode plate 111, a negative electrode plate 113 and a separator 112 provided between the positive electrode plate 111 and the negative electrode plate 113, is received in a space formed by a packaging film 2. In order to ensure the sealing property of the packaging film 2, a process of tightly pressing and heating is required at an opening (the electrode assembly 1 is put into the space formed by the packaging film 2 through the opening) of the packaging film 2, and surfaces of the packaging film 2 which package an electrode tab 12 need to be coated with an insulating seal adhesive 3. The packaging film 2 of the conventional pouch-type battery generally comprises a first receiving portion 21, a second receiving portion 22, and a third receiving portion 23. The packaging film 2 in the prior art generally uses a conventional aluminum plastic film, and an intermediate metal layer of the aluminum plastic film is an aluminum layer. Due to the lower hardness of the aluminum layer, the battery is easily deformed or even damaged when it is subjected to a pressure (such as due to dropping). However, if the packaging film 2 uses a metal layer with higher hardness to replace the conventional aluminum layer, a greater pressure must be used during the process of tightly pressing the packaging film 2. In this way, the second receiving portion 22 and the third receiving portion 23 of the packaging film 2 will apply a very large pressure on the electrode tab 12 which is weak, therefore a portion of the electrode tab 12 subjected to the pressure is damaged or even ruptured (as shown in FIG. 2).

SUMMARY OF THE PRESENT DISCLOSURE

In view of the problem existing in the background, an object of the present disclosure is to provide a pouch-type secondary battery, in which the electrode tab is not easily damaged or even ruptured during the process of tightly pressing and heating the packaging film, thereby protecting the electrode tab and improving the safety performance of the battery.

Another object of the present disclosure is to provide a pouch-type secondary battery, which can reduce the deformation of the battery when the battery is subjected to a pressure, and which can ensure the service life of the battery.

In order to achieve the above objects, the present disclosure provides a pouch-type secondary battery which comprises an electrode assembly and a packaging film. The electrode assembly comprises a main body and an electrode tab electrically connected with the main body. The packaging film receives and seals the electrode assembly, and the packaging film comprises: a first receiving portion corresponding to the main body of the electrode assembly and positioned outside the electrode assembly in a height direction; a second receiving portion extending obliquely along the height direction of the electrode assembly from one end of the first receiving portion close to the electrode tab of the electrode assembly in a longitudinal direction toward the electrode tab; and a third receiving portion extending along the longitudinal direction of the electrode assembly from one end of the second receiving portion close to the electrode tab of the electrode assembly in the longitudinal direction, and the third receiving portion is parallel to the first receiving portion, a portion of the electrode tab extends out of the third receiving portion. In which, a joint location between the second receiving portion and the first receiving portion and a joint location between the second receiving portion and the third receiving portion in the packaging film each are formed with a bending angle, the bending angles are equal in value and the bending angles each range from 130° to 160°.

The present disclosure has the following beneficial effects: in the pouch-type secondary battery according to the present disclosure, the packaging film has the first receiving portion, the second receiving portion and the third receiving portion to receive the electrode assembly. Here, the third receiving portion is parallel to the first receiving portion, and the joint location between the second receiving portion and the first receiving portion and the joint location between the second receiving portion and the third receiving portion each are formed with the bending angle, the bending angles are equal in value and the bending angles each range from 130° to 160°. Because the bending angles in the range are relatively large, when the packaging film is tightly pressed and heated, there is no need to apply a too large pressure on the second receiving portion and the third receiving portion, so the electrode tab is not easily damaged or even ruptured, thereby protecting the electrode tab and improving the safety performance of the battery.

Figure 1:
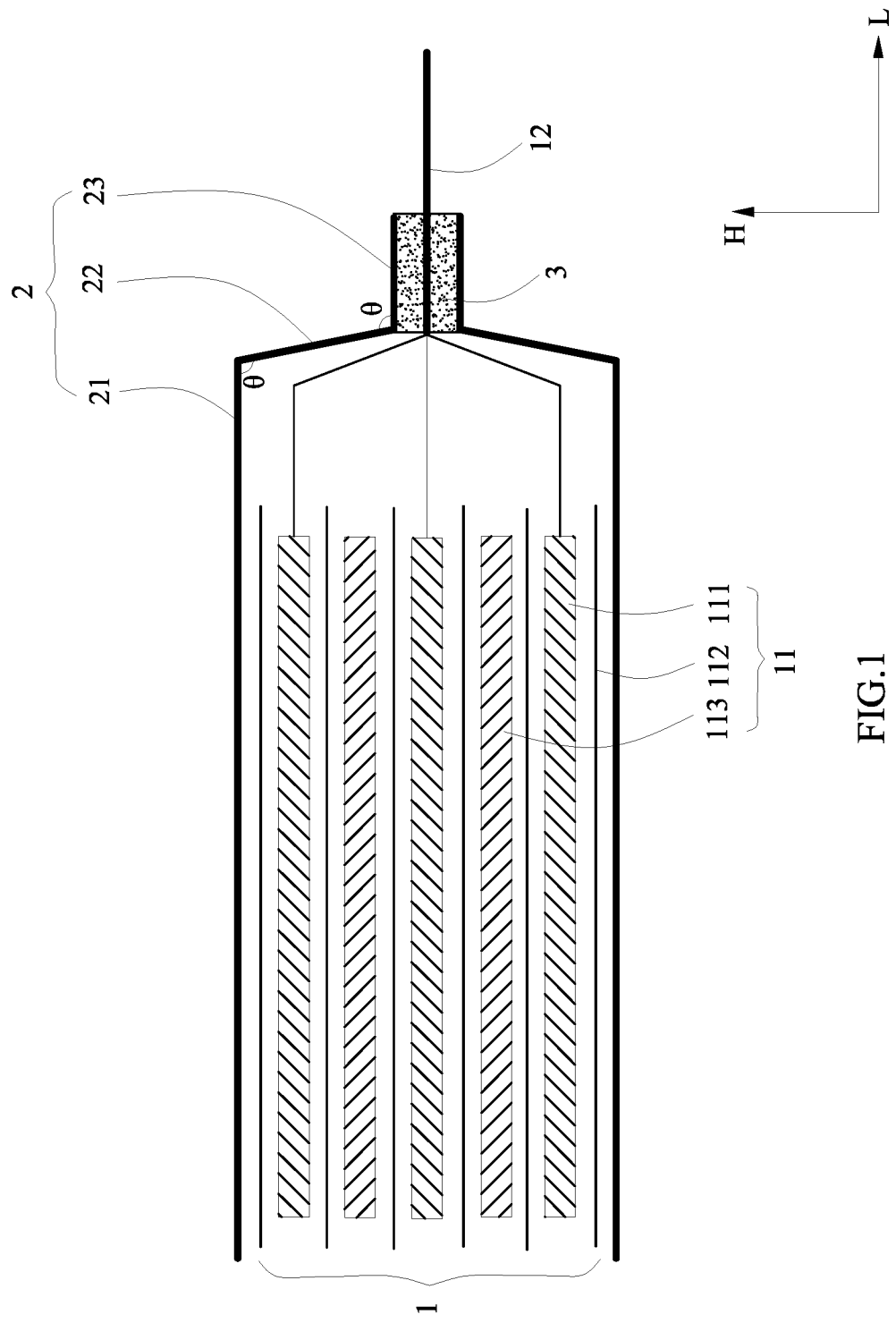
FIG. 1 is a whole schematic view of a pouch-type secondary battery in the prior art, in which an electrode tab is not ruptured under a pressure.

Reference numerals are represented as follows:
1 electrode assembly
11 main body
111 positive electrode plate
112 separator
113 negative electrode plate
12 electrode tab
2 packaging film
21 first receiving portion
22 second receiving portion 23 third receiving portion
3 insulating seal adhesive
L length direction
H height direction
W width direction
θ bending angle

DETAILED DESCRIPTION

Hereinafter a pouch-type secondary battery according to the present disclosure will be described in detail in combination with the figures.

Referring to FIG. 1 to FIG. 5, a pouch-type secondary battery according to the present disclosure comprises an electrode assembly 1 and a packaging film 2. The electrode assembly 1 comprises a main body 11 and an electrode tab 12 electrically connected with the main body 11. The packaging film 2 receives and seals the electrode assembly 1, and the packaging film 2 comprises: a first receiving portion 21 corresponding to the main body 11 of the electrode assembly 1 and positioned outside the electrode assembly 1 in a height direction H; a second receiving portion 22 extending obliquely along the height direction H of the electrode assembly 1 from one end of the first receiving portion 21 close to the electrode tab 12 of the electrode assembly 1 in a longitudinal direction L toward the electrode tab 12; and a third receiving portion 23 extending along the longitudinal direction L of the electrode assembly 1 from one end of the second receiving portion 22 close to the electrode tab 12 of the electrode assembly 1 in the longitudinal direction L, and the third receiving portion 23 is parallel to the first receiving portion 21, a portion of the electrode tab 12 extends out of the third receiving portion 23.

Figure 4:
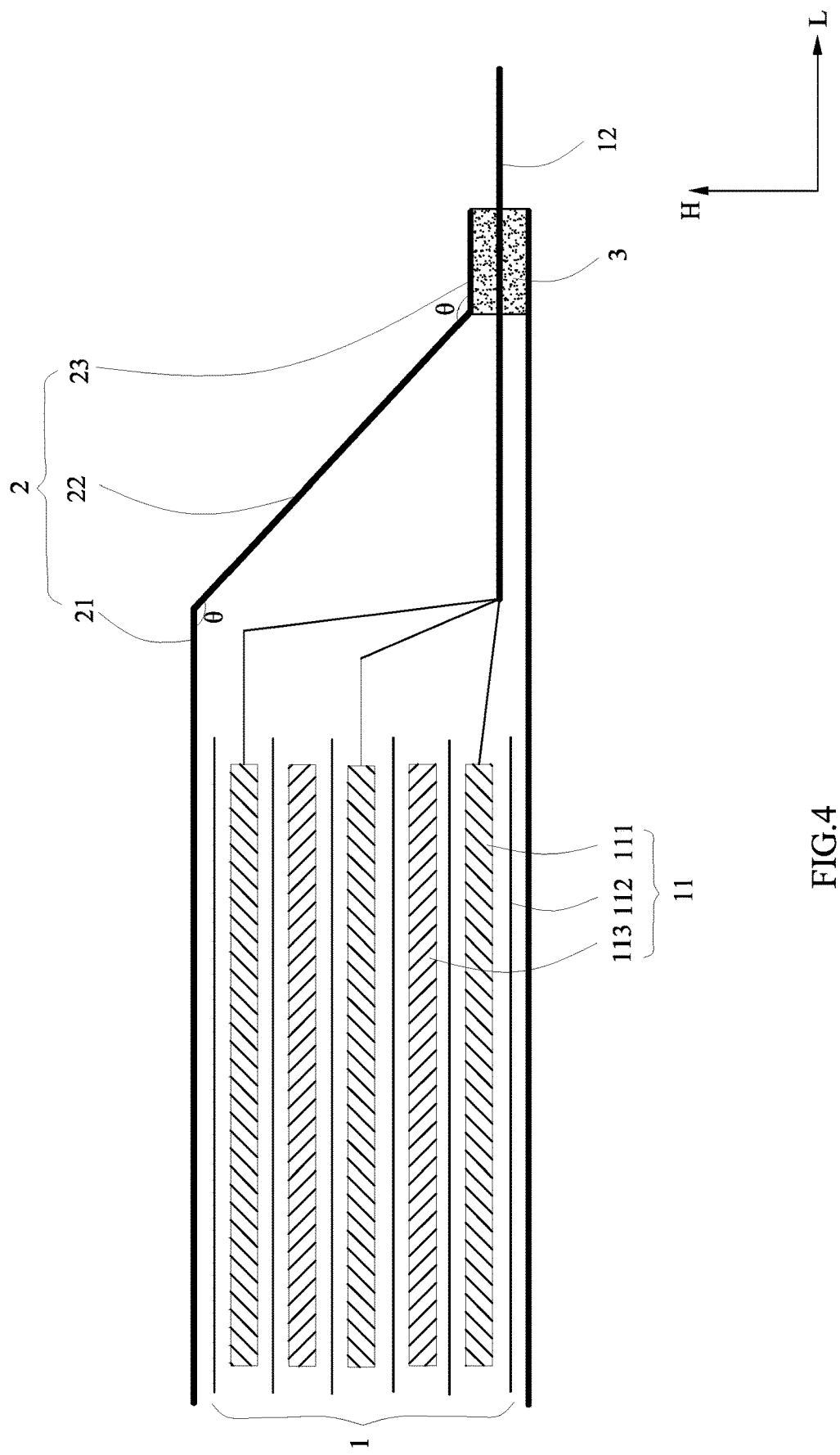
FIG. 4 is a varied example of FIG. 3.
Figure 5:
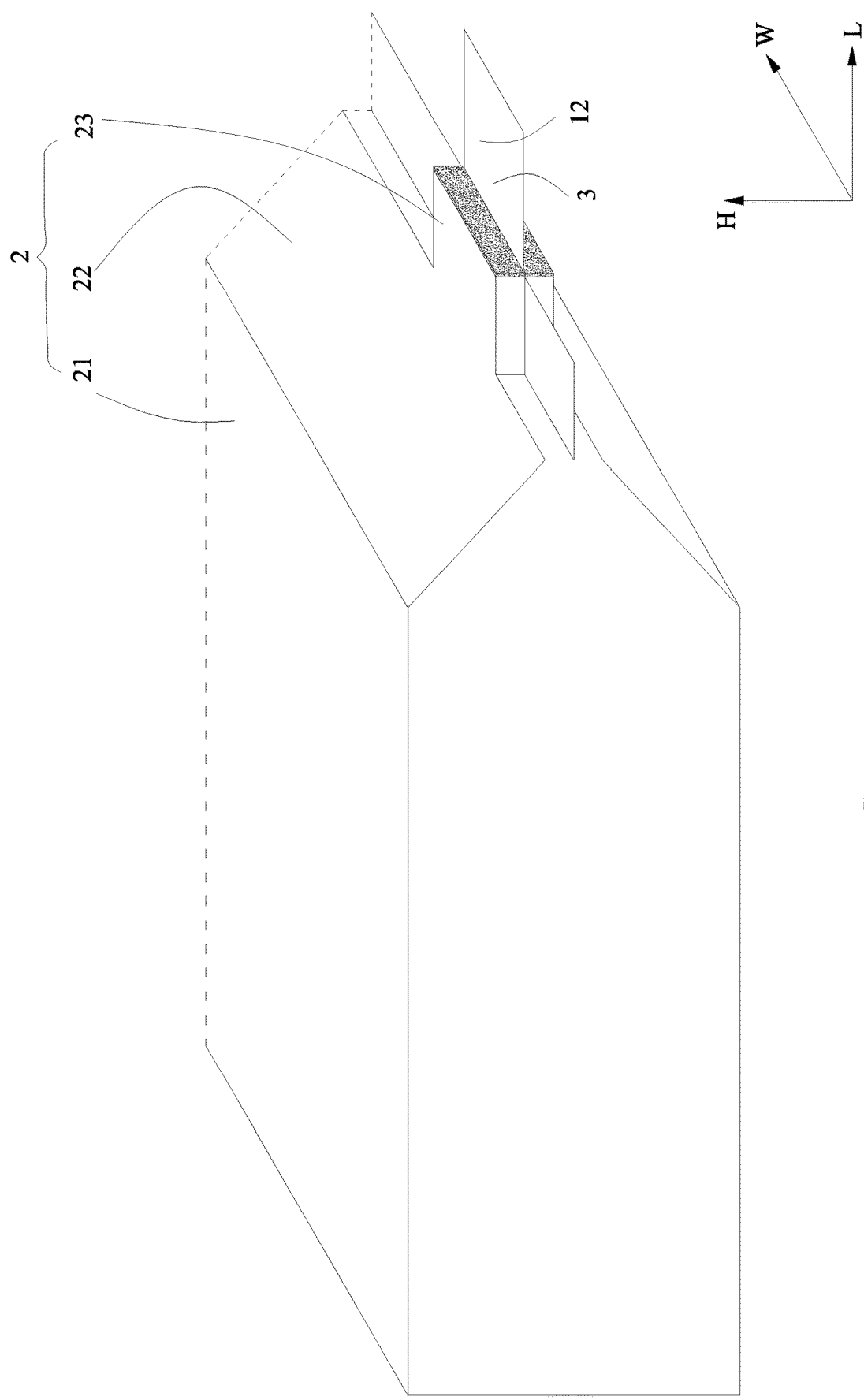
FIG. 5 is a perspective view of the pouch-type secondary battery of FIG. 3, in which only one electrode tab is shown for sake of convenience of description.
Figure 6:
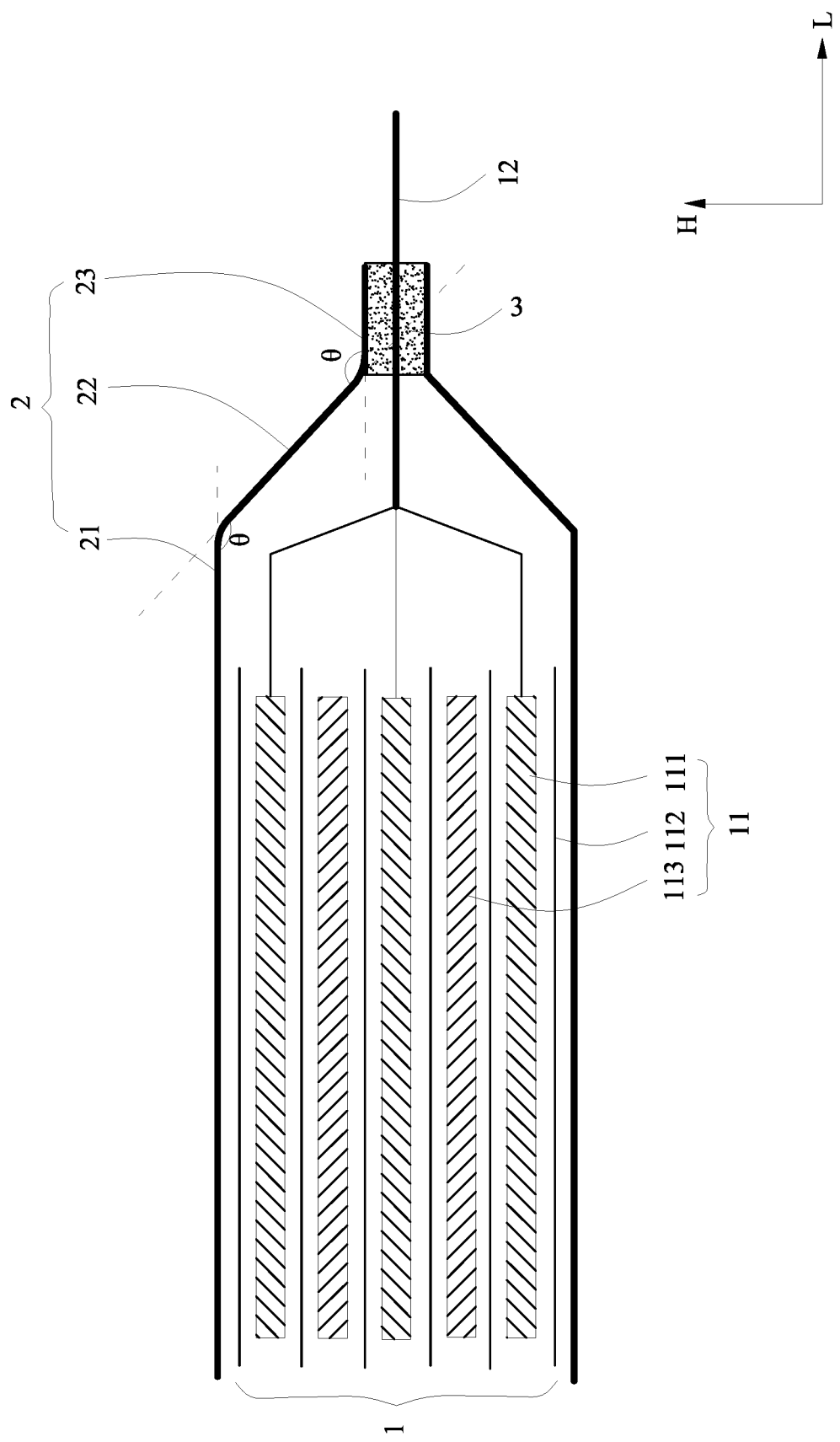
FIG. 6 is another varied example of FIG. 3, in which for the sake of comparison, only the case where a chamfer in an upper side portion is rounded is given in order to explain a bending angle.

A joint location between the second receiving portion 22 and the first receiving portion 21 and a joint location between the second receiving portion 22 and the third receiving portion 23 in the packaging film 2 each are formed with a bending angle θ (the bending angle may be an angle which is formed directly and does not have a chamfer, as shown in FIG. 1 to FIG. 5; the bending angle may be an angle due to a chamfer, and the angle is defined according to extension lines in the engineering standard, as shown in FIG. 6, the chamfer may be rounded), the bending angles θ are equal in value and the bending angles θ each range from 130° to 160°.

In the pouch-type secondary battery according to the present disclosure, the packaging film 2 has the first receiving portion 21, the second receiving portion 22 and the third receiving portion 23 to receive the electrode assembly 1. Here, the third receiving portion 23 is parallel to the first receiving portion 21, and the joint location between the second receiving portion 22 and the first receiving portion 21 and the joint location between the second receiving portion 22 and the third receiving portion 23 each are formed with the bending angle θ, the bending angles θ are equal in value and the bending angles θ each range from 130° to 160°. Because the bending angles θ in the range are relatively large, when the packaging film 2 is tightly pressed and heated (especially when a hardness of the packaging film 2 is greater than a hardness of the electrode tab 12), there is no need to apply a too large pressure on the second receiving portion 22 and the third receiving portion 23, so the electrode tab 12 is not easily damaged or even ruptured, thereby protecting the electrode tab 12 and improving the safety performance of the battery.

It should be noted that, in order to make the first receiving portion 21, the second receiving portion 22 and the third receiving portion 23 closely attach with the corresponding portions of the electrode assembly 1, when the value of each bending angle θ is less than 130°, it is easy to make the pressure concentrated; when the value of each bending angle θ is greater than 160°, it is difficult to tightly press the electrode tab 12 of the electrode assembly 1 at the third receiving portion 23, and if using a greater pressure to press, the electrode tab 12 is easily damaged, so it is not beneficial to the forming control of the pouch-type secondary battery. Therefore, in order to prevent the pressure from being concentrated or to minimize the pressure to protect the electrode tab 12 of the electrode assembly 1, the value of each bending angle θ should be between 130° and 160° in the production of the packaging film 2 as far as possible.

Further, it should be noted that, although FIG. 5 only shows one electrode tab 12 for sake of convenience of description, actually the pouch-type secondary battery has two electrode tabs 12 opposite in polarity, and the two electrode tabs 12 may be positioned at the same side of the electrode assembly 1, the two electrode tabs 12 also may be positioned at the opposite sides of the electrode assembly 1 respectively.

Figure 2:
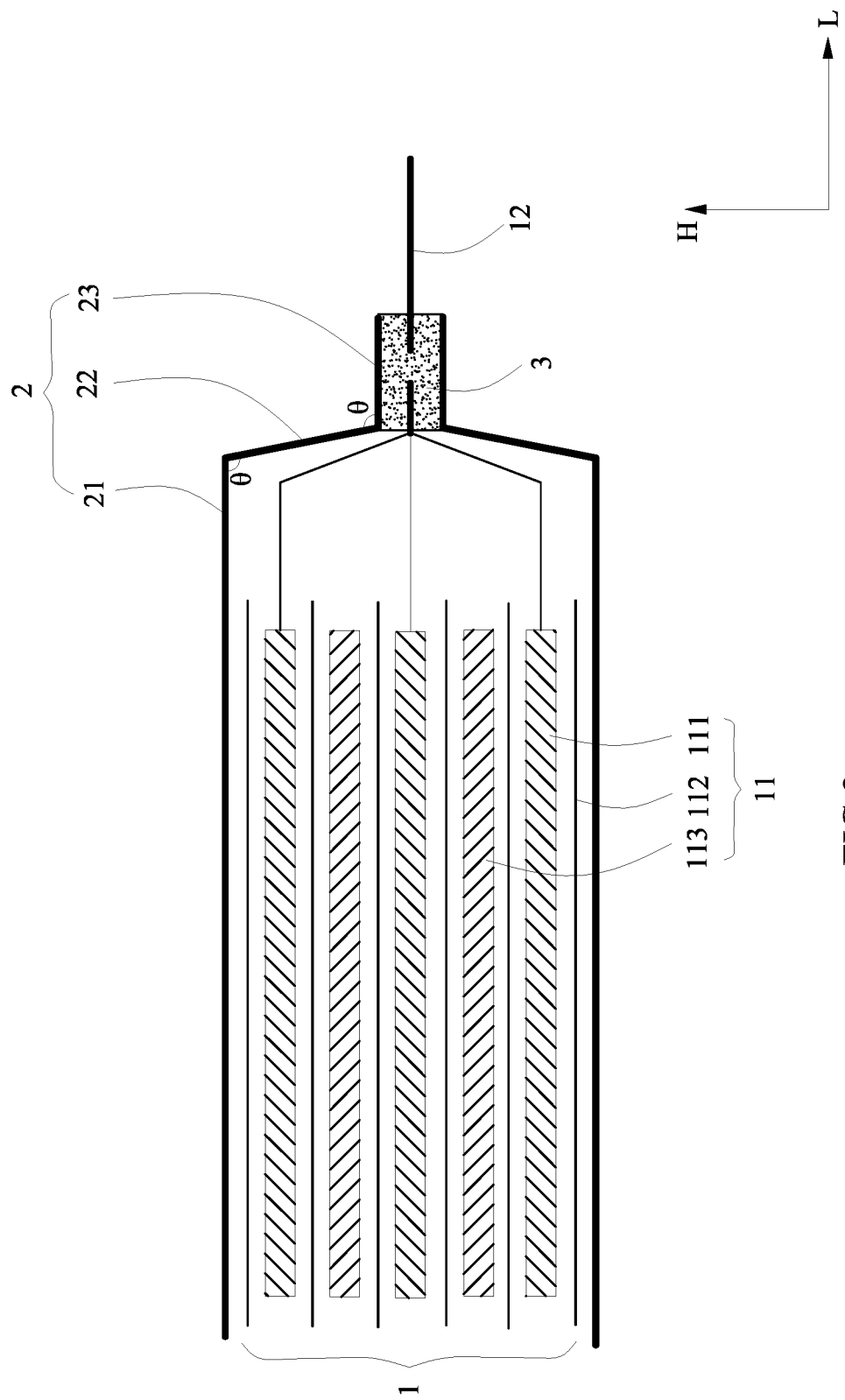
FIG. 2 is a whole schematic view of the pouch-type secondary battery of FIG. 1 after the electrode tab is ruptured under a pressure.
Figure 3:
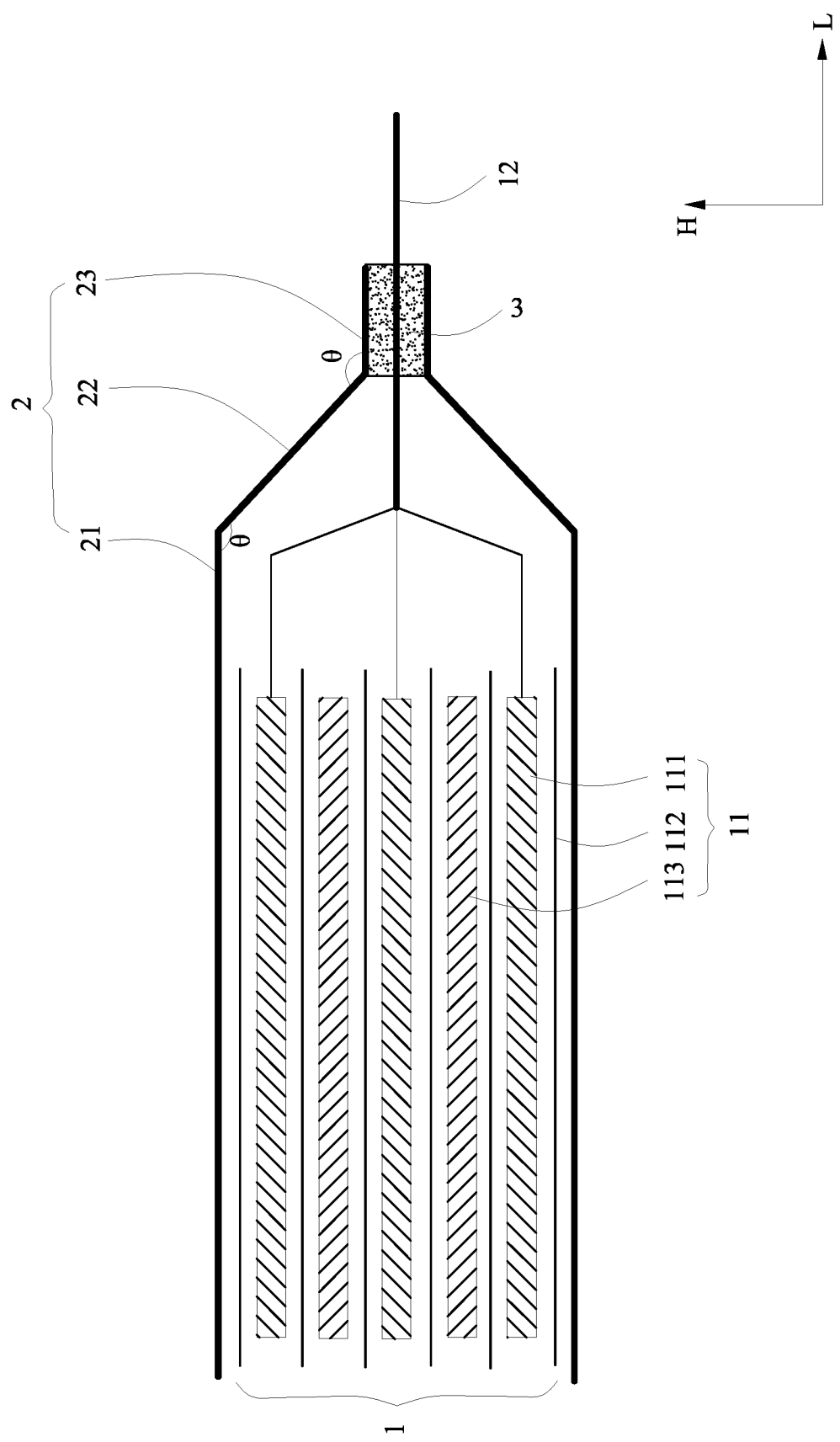
FIG. 3 is a whole schematic view of a pouch-type secondary battery according to the present disclosure.

In the pouch-type secondary battery according to the present disclosure, in an embodiment, referring to FIG. 1 to FIG. 3, the second receiving portion 22 extends obliquely along the height direction H of the electrode assembly 1 on both sides of the electrode tab 12 from the one end of the first receiving portion 21 close to the electrode tab 12 of the electrode assembly 1 in the longitudinal direction L toward the electrode tab 12.

In an embodiment, referring to FIG. 4, the second receiving portion 22 extends obliquely along the height direction H of the electrode assembly 1 on one side of the electrode tab 12 from the one end of the first receiving portion 21 close to the electrode tab 12 of the electrode assembly 1 in the longitudinal direction L toward the electrode tab 12.

In an embodiment, the packaging film 2 includes a metal layer, and the metal layer may be greater than the electrode tab 12 in hardness. It should be noted that, because the hardness of the metal layer of the packaging film 2 is greater than the hardness of the electrode tab 12, if the packaging film 2 of the prior art is used, there is need to use a larger pressure during the process of tightly pressing the packaging film 2 and the electrode assembly 1, thereby making the second receiving portion 22 and the third receiving portion 23 of the packaging film 2 apply a very large pressure on the electrode tab 12, and the portion of the electrode tab 12 subjected to the pressure is damaged or even ruptured. Therefore, in view of this situation, the packaging film 2 of the pouch-type secondary battery according to the present disclosure can solve the above problem and ensure the service life of the battery.

In an embodiment, referring to FIG. 1 to FIG. 5, the third receiving portion 23 of the packaging film 2 may be parallel to the electrode tab 12. Further, an outer surface and an inner surface of the third receiving portion 23 in the height direction H of the electrode assembly 1 are parallel to an upper surface and a lower surface of the electrode tab 12 in the height direction H. By adopting such a parallel arrangement, it is ensured that the pressure subjected by every portion of the electrode tab 12 closely attaching with the third receiving portion 23 is uniform when the third receiving portion 23 and the electrode tab 12 are tightly pressed.

In an embodiment, referring to FIG. 1 to FIG. 5, the main body 11 of the electrode assembly 1 comprises a positive electrode plate 111, a separator 112 and a negative electrode plate 113. The electrode tab 12 comprises a positive electrode tab 12 and a negative electrode tab 12.

In an embodiment, the positive electrode plate 111, the separator 112 and the negative electrode plate 113 are laminated or wound to form the main body 11 of the electrode assembly 1.

In an embodiment, a distance between the joint location between the first receiving portion 21 and the second receiving portion 22 and the joint location between the third receiving portion 23 and the second receiving portion 22 in the height direction H may be 5 mm~40 mm. It should be noted that, the pouch-type secondary battery according to the present disclosure is particularly suitable to avoid the electrode tab 12 being damaged when it is within this range, thereby protecting the whole battery. Because when the distance between the joint location between the first receiving portion 21 and the second receiving portion 22 and the joint location between the third receiving portion 23 and the second receiving portion 22 is less than 5 mm, there is no problem that the pressure is too large and in turn to cause the electrode tab 12 to be ruptured.

In an embodiment, the pouch-type secondary battery may further comprise: an insulating seal adhesive 3 which surrounds a portion of the electrode tab 12 positioned in the third receiving portion 23 and is firmly adhered with the inner surface of the third receiving portion 23.

In an embodiment, the material of the insulating seal adhesive 3 may be polyimide or polyethylene. Of course, there is not limited thereto, the insulating seal adhesive 3 may also be made of other materials.

In an embodiment, an outer layer of the packaging film 2 may be a polyethylene terephthalate layer, an intermediate layer of the packaging film 2 is a metal layer, and an inner layer of the packaging film 2 is a polypropylene layer or a polyethylene layer.

In an embodiment, a material of the electrode tab 12 may be aluminum, and the metal layer of the packaging film 2 may be a copper layer or a stainless steel layer.

In an embodiment, a thickness of the metal layer of the packaging film 2 may be 10 μm~150 μm.

In an embodiment, a thickness of the packaging film 2 may be 25 μm~300 μm.

In an embodiment, the packaging film 2 may be formed by stamping. Of course, there is not limited thereto, the packaging film 2 may also be formed by other forming methods.

What is claimed is:

1. A pouch-type secondary battery, comprising:
   an electrode assembly comprising a main body and an electrode tab electrically connected with the main body;
   a packaging film receiving and sealing the electrode assembly, and comprising:
   a first receiving portion corresponding to the main body of the electrode assembly and positioned outside the electrode assembly in a height direction;
   a second receiving portion extending obliquely along the height direction of the electrode assembly from one end of the first receiving portion close to the electrode tab of the electrode assembly in a longitudinal direction toward the electrode tab; and
   a third receiving portion extending along the longitudinal direction of the electrode assembly from one end of the second receiving portion close to the electrode tab of the electrode assembly in the longitudinal direction, and the third receiving portion being parallel to the first receiving portion, a portion of the electrode tab extending out of the third receiving portion;
   wherein a joint location between the second receiving portion and the first receiving portion and a joint location between the second receiving portion and the third receiving portion in the packaging film each are formed with a bending angle, the bending angles are equal in value and the bending angles each range from 130° to 160°.

2. The pouch-type secondary battery according to claim 1, wherein the second receiving portion extends obliquely along the height direction of the electrode assembly on both sides of the electrode tab from the one end of the first receiving portion close to the electrode tab of the electrode assembly in the longitudinal direction toward the electrode tab.

3. The pouch-type secondary battery according to claim 1, wherein the second receiving portion extends obliquely along the height direction of the electrode assembly on one side of the electrode tab from the one end of the first receiving portion close to the electrode tab of the electrode assembly in the longitudinal direction toward the electrode tab.

4. The pouch-type secondary battery according to claim 1, wherein the packaging film includes a metal layer, and the metal layer is greater than the electrode tab in hardness.

5. The pouch-type secondary battery according to claim 1, wherein the third receiving portion of the packaging film is parallel to the electrode tab.

6. The pouch-type secondary battery according to claim 5, wherein an outer surface and an inner surface of the third receiving portion in the height direction of the electrode assembly are parallel to an upper surface and a lower surface of the electrode tab in the height direction.

7. The pouch-type secondary battery according to claim 1, wherein
   the main body of the electrode assembly comprises a positive electrode plate, a separator and a negative electrode plate;
   the electrode tab comprises a positive electrode tab and a negative electrode tab.

8. The pouch-type secondary battery according to claim 7, wherein the positive electrode plate, the separator and the negative electrode plate are laminated or wound to form the main body of the electrode assembly.

9. The pouch-type secondary battery according to claim 1, wherein a distance between the joint location between the first receiving portion and the second receiving portion and the joint location between the third receiving portion and the second receiving portion in the height direction is 5 mm~40 mm.

10. The pouch-type secondary battery according to claim 1, wherein the pouch-type secondary battery further comprises: an insulating seal adhesive which surrounds a portion of the electrode tab positioned in the third receiving portion and is firmly adhered with an inner surface of the third receiving portion.

11. The pouch-type secondary battery according to claim 1, wherein a material of the insulating seal adhesive is polyimide or polyethylene.

12. The pouch-type secondary battery according to claim 1, wherein an outer layer of the packaging film is a polyethylene terephthalate layer, an intermediate layer of the packaging film is a metal layer, and an inner layer of the packaging film is a polypropylene layer or a polyethylene layer.

13. The pouch-type secondary battery according to claim 4, wherein a material of the electrode tab is aluminum, and the metal layer of the packaging film is a copper layer or a stainless steel layer.

14. The pouch-type secondary battery according to claim 1, wherein a thickness of the metal layer of the packaging film is 10 μm~150 μm.

15. The pouch-type secondary battery according to claim 1, wherein a thickness of the packaging film is 25 μm~300 μm.

16. The pouch-type secondary battery according to claim 1, wherein the packaging film is formed by stamping.

* * * * *